(12) United States Patent
Ozeki et al.

(10) Patent No.: US 11,639,150 B2
(45) Date of Patent: May 2, 2023

(54) AIRBAG DEVICE

(71) Applicant: TOYODA GOSEI CO., LTD., Kiyosu (JP)

(72) Inventors: Makoto Ozeki, Kiyosu (JP); Akira Yasuda, Kiyosu (JP); Taizo Suemitsu, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 17/737,094

(22) Filed: May 5, 2022

(65) Prior Publication Data
US 2022/0396232 A1   Dec. 15, 2022

(30) Foreign Application Priority Data

Jun. 9, 2021 (JP) .............................. JP2021-96931

(51) Int. Cl.
*B60R 21/2165*  (2011.01)
*B60R 21/36*  (2011.01)
(Continued)

(52) U.S. Cl.
CPC .......... *B60R 21/237* (2013.01); *B60R 21/217* (2013.01); *B60R 21/2165* (2013.01);
(Continued)

(58) Field of Classification Search
CPC .............. B60R 21/237; B60R 21/2165; B60R 21/36; B60R 21/34; B60R 21/217;
(Continued)

(56) References Cited

U.S. PATENT DOCUMENTS

| 6,082,765 A * | 7/2000 | Bowers ............... B60R 21/2155 |
| | | 280/739 |
| 2003/0234525 A1* | 12/2003 | Igawa .................. B60R 21/261 |
| | | 280/736 |

(Continued)

FOREIGN PATENT DOCUMENTS

| JP | 2004-299442 A | 10/2004 |
| JP | 6375484 B2 | 8/2018 |
| JP | 2019-34683 A | 3/2019 |

*Primary Examiner* — Keith J Frisby
(74) *Attorney, Agent, or Firm* — Posz Law Group, PLC

(57) ABSTRACT

An airbag device includes an airbag, a case in which the folded airbag is housed, and an airbag cover that covers the folded airbag. An attachment portion of the airbag cover is attached to a peripheral wall portion of the case by a rivet being caused to pass through. The case is such that a vicinity of a boundary region between the peripheral wall portion and a bottom wall portion is curved in an approximate arc in cross-section. The attachment portion includes a protruding portion that protrudes toward the peripheral wall portion side in an end edge farther to a leading end side than a region of penetration of the rivet. The protruding portion is disposed in a position opposing a curved region configuring a boundary region between the peripheral wall portion and the bottom wall portion, and is protruded in such a way as to be oriented farther to a central side of the bottom wall portion than an outer side face of the peripheral wall portion, and an edge on the peripheral wall portion side of a protruding end face is disposed in a state of non-contact with the curved region.

5 Claims, 7 Drawing Sheets

(51) Int. Cl.
*B60R 21/217* (2011.01)
*B60R 21/237* (2006.01)
*B60R 21/34* (2011.01)
*B60R 21/215* (2011.01)

(52) U.S. Cl.
CPC .......... *B60R 21/2171* (2013.01); *B60R 21/36* (2013.01); *B60R 2021/21537* (2013.01); *B60R 2021/346* (2013.01)

(58) Field of Classification Search
CPC .............. B60R 21/2171; B60R 21/215; B60R 2021/21537; B60R 2021/346
USPC ............................... 280/728.2, 728.3, 728.1
See application file for complete search history.

(56) References Cited

U.S. PATENT DOCUMENTS

| | | | |
|---|---|---|---|
| 2006/0042854 A1* | 3/2006 | Sasaki | B60R 21/36 180/274 |
| 2014/0318881 A1 | 10/2014 | Sugimoto et al. | |
| 2019/0054886 A1 | 2/2019 | Ono et al. | |

* cited by examiner

AIRBAG DEVICE

CROSS REFERENCE TO RELATED APPLICATIONS

The present application claims priority from Japanese Patent Application No. 2021-96931 of Ozeki et al., filed on Jun. 9, 2021, the entire disclosures of which is incorporated herein by reference.

BACKGROUND

1. Technical Field

The present disclosure relates to an airbag device of a configuration including an airbag that can inflate by an inflating gas being caused to flow into an interior, a case in which a folded airbag is housed and which has a protrusion aperture through which an inflating airbag can be protruded, and an airbag cover that covers a folded airbag.

2. Description of Related Art

As an existing airbag device, there is a pedestrian airbag device disposed in a vicinity of a rear end of a hood panel of a vehicle, as shown in Japanese Patent No. 6,375,484. In this pedestrian airbag device, an airbag cover made from a soft synthetic resin disposed in such a way as to cover a protrusion aperture disposed on an upper end side of a case is attached to a case having rigidity by an attachment piece portion extending downward from a peripheral edge of a door portion covering the protrusion aperture being coupled to a peripheral wall portion of the case using blind rivets.

In the existing airbag device, a door portion provided in the airbag cover is of a configuration that, when an airbag is inflating, opens toward a front side or a rear side due to being pushed by the airbag while a breakable portion provided in a peripheral edge is broken. When the inflating airbag pushes the door portion up at a start of airbag inflation, the attachment piece portion attempts to move upward in conjunction with the pushing up of the door portion. Because of this, stress concentrates in a region of a through hole that a blind rivet is caused to pass through in the attachment piece portion, and there is a case wherein the through hole extends in such a way as to widen an aperture. Further, there is a case wherein a force pushing up the door portion is reduced by this kind of through hole peripheral edge extension, and the breakable portion provided in the peripheral edge of the door portion cannot be broken swiftly.

SUMMARY

The present disclosure relates to an airbag device of the following configuration.

The airbag device is mounted in a vehicle, and includes an airbag that can inflate owing to an inflating gas being caused to flow into an interior, a case having rigidity, in which the folded airbag is housed and which has a protrusion aperture through which the inflating airbag can be protruded, and an airbag cover that is made from a soft synthetic resin and covers the folded airbag, wherein the case has a bottom wall portion and a peripheral wall portion of an approximately rectangular tube form extending from the bottom wall portion, is of an approximate box form including the protrusion aperture, and a vicinity of a boundary region between the peripheral wall portion and the bottom wall portion is configured curved in an approximate arc form in cross-section, the airbag cover includes a top wall portion having a door portion that covers the protrusion aperture and can open by being pushed by the airbag while a peripheral edge is broken when the airbag is inflating, and an attachment piece portion that extends from a hinge portion side forming a center of rotation when the door portion opens or a leading end side when the door portion opens in the top wall portion, and is attached to the peripheral wall portion, the attachment piece portion is of a configuration attached to the peripheral wall portion by a multiple of rivets disposed in such a way as to penetrate through holes provided in the attachment piece portion and the peripheral wall portion, and is configured to include a protruding portion that protrudes toward the peripheral wall portion side in an end edge farther to a leading end side than a region of penetration of at least one rivet, and the protruding portion is disposed in a position opposing a curved region configuring a boundary region between the peripheral wall portion and the bottom wall portion in a state wherein the attachment piece portion is attached to the peripheral wall portion, is protruded in such a way as to be oriented farther to a central side of the bottom wall portion than an outer side face of the peripheral wall portion, and is configured in such a way as to be disposed in a state of non-contact with the curved region, with an edge on the peripheral wall portion side of a protruding end face as a position regulating edge portion.

BRIEF DESCRIPTION OF DRAWINGS

FIGS. 7A and 7B are partially enlarged vertical sectional views illustrating a movement of the attachment piece portion when an inflating airbag pushes up the airbag cover in the pedestrian airbag device of the embodiment, wherein FIG. 7A shows a state before pushing up, and FIG. 7B shows a state after pushing up.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
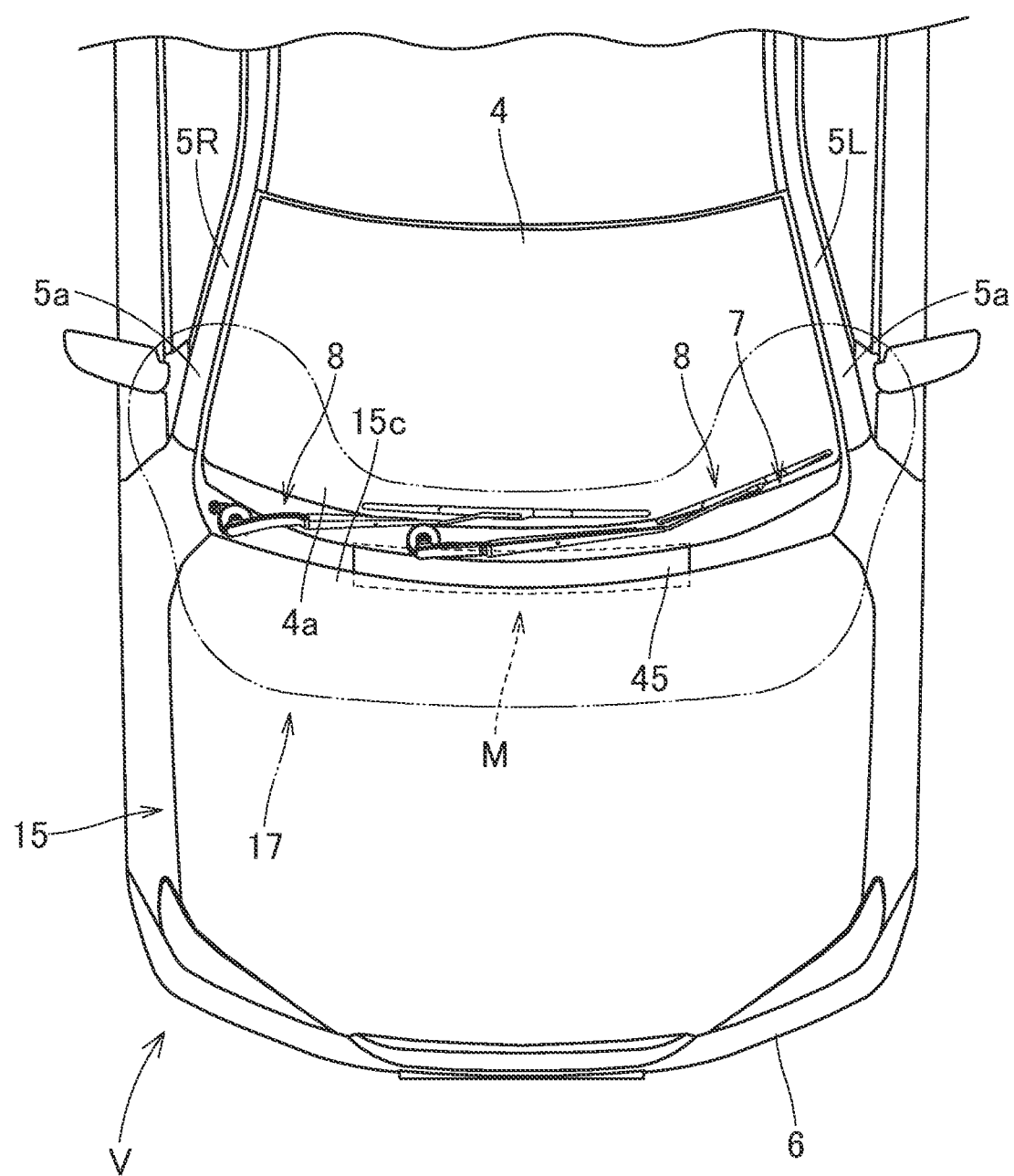
FIG. 1 is a plan view of a vehicle in which a pedestrian airbag device that is one embodiment of the present disclosure is mounted.
Figure 2:
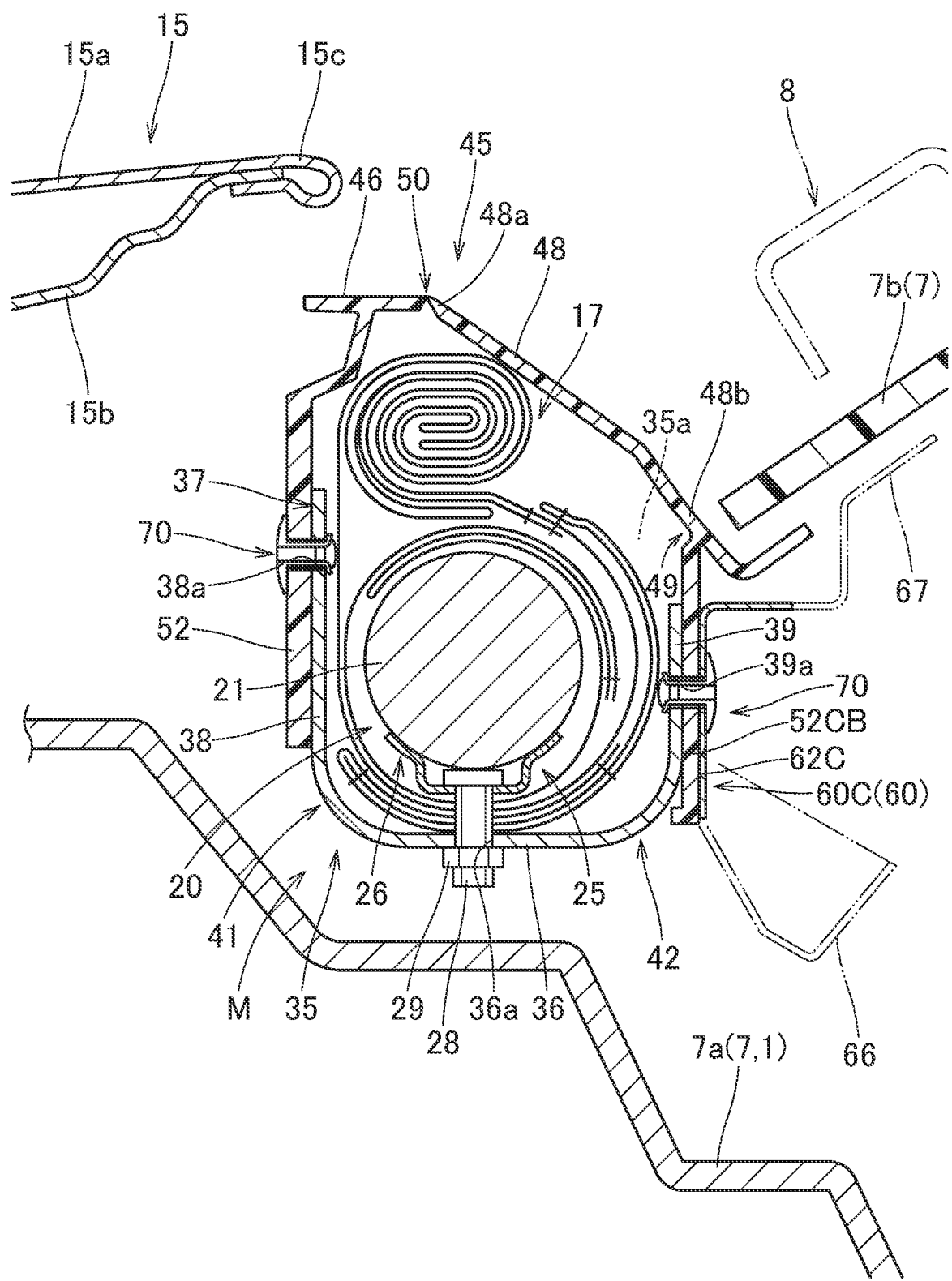
FIG. 2 is a schematic vertical sectional view following a front-rear direction of the pedestrian airbag device of the embodiment, and shows a left-right direction central region of a case.

Hereafter, an embodiment of the present disclosure will be described, based on the drawings. In the embodiment, the description will be given employing a pedestrian airbag device M mounted in a vicinity of a rear end 15c of a hood panel 15 of a vehicle V as an example of an airbag device. As shown in FIGS. 1 and 2, the pedestrian airbag device (hereafter abbreviated as "airbag device") M is disposed in a position that is a position in proximity to the rear end 15c of the hood panel 15, in an approximate center in a left-right direction of the vehicle V between left and right front pillars 5L and 5R. In the specification, a description is given with front-rear, up-down, and right-left directions coinciding with front-rear, up-down, and right-left directions of the vehicle V, unless stated otherwise.

As shown in FIG. 1, the hood panel 15 is disposed in such a way as to cover an engine room of the vehicle V from above. The hood panel 15 is coupled to a body 1 side of the vehicle V by an unshown hinge portion disposed in a vicinity of the rear end 15c on both left and right edge sides in such a way as to be openable and closable from the front. In the case of the embodiment, the hood panel 15 is formed of a steel plate or a sheet material of aluminum (an aluminum alloy) or the like, and includes an outer panel 15a and an inner panel 15b, as shown in FIG. 2. As shown in FIG. 1, the rear end 15c side of the hood panel 15 is caused to curve in the left-right direction in such a way that a left-right direction center is positioned to the front and both left-right direction end sides are positioned to the rear, in order to coincide with a front windshield 4 to be described hereafter.

As shown in FIG. 2, a cowl 7 formed of a cowl panel 7a of a high rigidity on the body 1 side and a cowl louver 7b made from a synthetic resin above the cowl panel 7a is disposed to the rear of the hood panel 15. The cowl louver 7b is disposed in such a way that a rear end side is continuous with a lower portion 4a side of the front windshield 4. The cowl 7 is also formed to be curved in order to coincide with the curved form of the rear end 15c of the hood panel 15 (refer to FIG. 1). Also, two wipers 8 are disposed in a region of the cowl 7, as shown in FIG. 1. The wipers 8 are disposed in such a way as to protrude upward from the cowl louver 7b, as indicated by a two-dot chain line in FIG. 2. The front pillars 5L and 5R are disposed outward of the front windshield 4 on the left and right.

Figure 4:
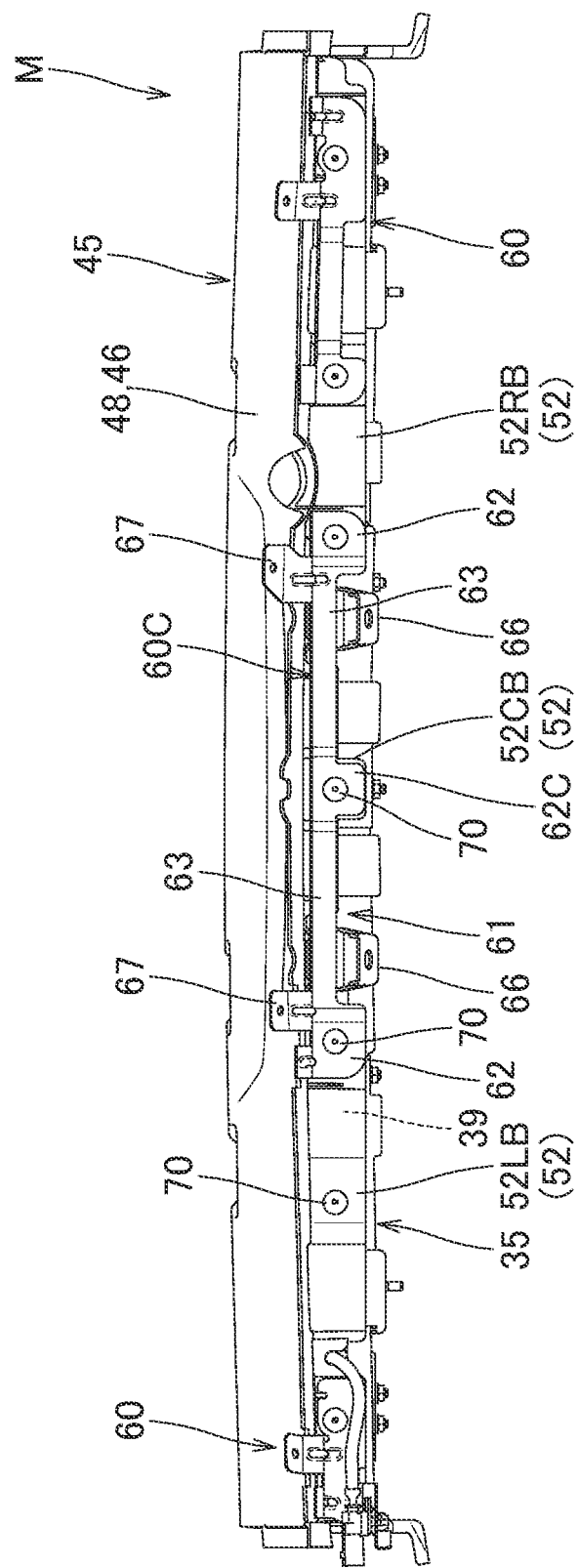
FIG. 4 is a rear view of the pedestrian airbag device of the embodiment seen from a rear side.
Figure 5:
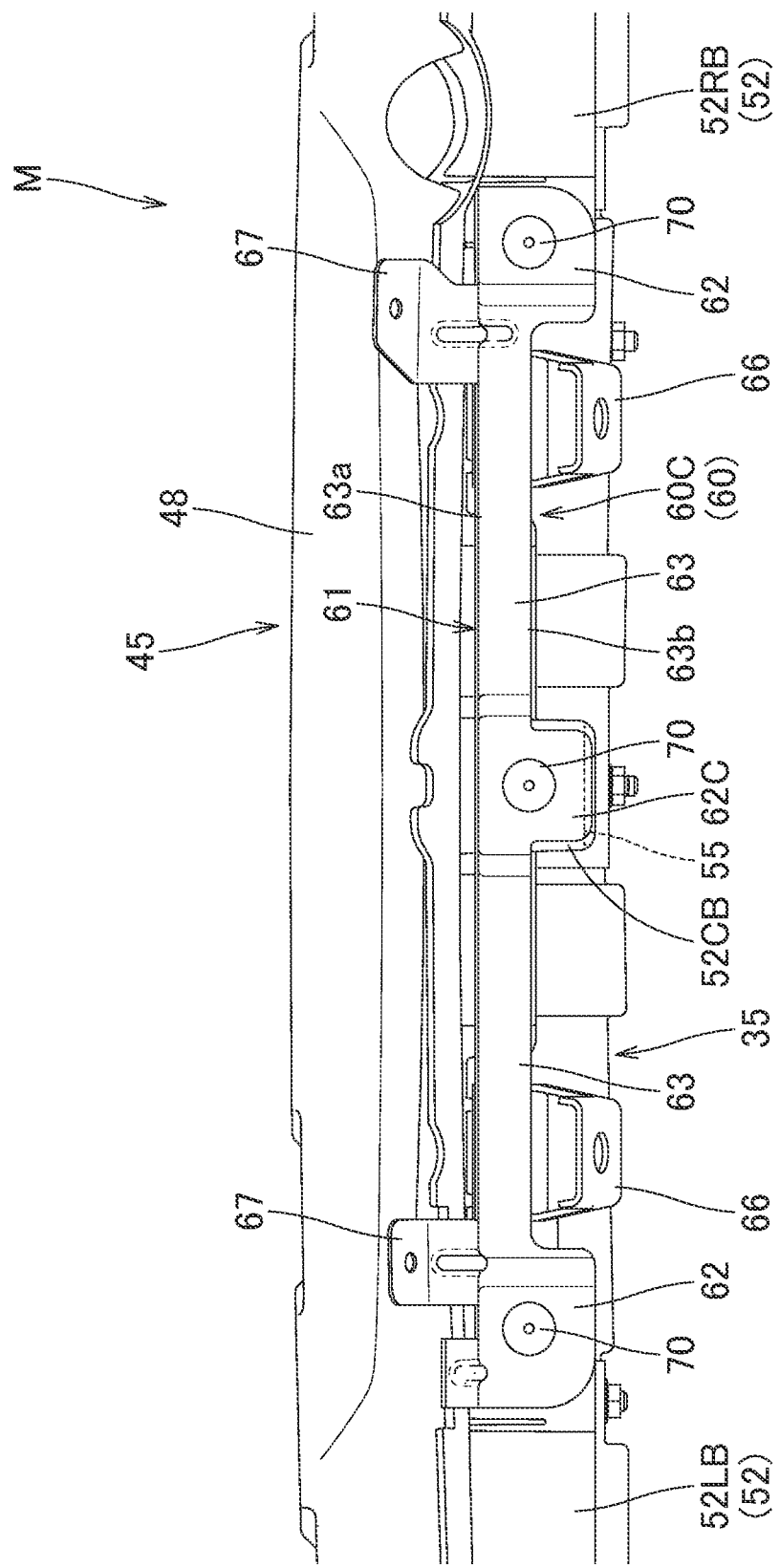
FIG. 5 is a partially enlarged view showing a left-right direction central side region of the rear view of FIG. 4.

As shown in FIGS. 2 and 4, the airbag device M is of a configuration including an airbag 17 that can inflate owing to an inflating gas being caused to flow into an interior, an inflator 20 that supplies an inflating gas to the airbag 17, a case 35 that houses the folded airbag 17 and the inflator 20, an airbag cover 45 that covers the folded airbag 17, and attachment brackets 60 that attach the case 35 to the cowl 7 side, which is the body 1 side of the vehicle.

The airbag 17 can inflate owing to an inflating gas being caused to flow into the interior, and is of a bag form formed of a sheet material having flexibility. In the case of the embodiment, the airbag 17 is such that an external form when inflation is completed is an approximate U-form wide in a left-right direction as seen from the front side, as indicated by a two-dot chain line in FIG. 1. The airbag 17 is configured in such a way as to cover a region from the rear end 15c side of the hood panel 15 to the cowl 7, and lower portion 5a sides of front faces of the left and right front pillars 5L and 5R, when inflation is completed.

The inflator 20 includes an inflator main body 21 and an attachment bracket 25 for attaching the inflator main body 21 to the case 35. In the case of the embodiment, the inflator 20 is inserted into the interior of the airbag 17 in such a way as to cause an attachment bolt 28 of the attachment bracket 25 to protrude to an exterior, and coupled to the airbag 17. An external form of the inflator main body 21 is an approximately cylindrical form whose axial direction approximately follows the left-right direction. An unshown gas ejecting portion is disposed on one axial direction end side of the inflator main body 21. The attachment bracket 25 includes a holding portion 26, which holds the inflator main body 21, and the attachment bolt 28 protruding downward from the holding portion 26. Although a detailed depiction is omitted, a multiple of the attachment bolt 28 are juxtaposed on a side (the left-right direction side) in a direction following a longitudinal direction of the holding portion 26. Also, in the embodiment, the attachment bracket 25, in a state wherein the inflator main body 21 is held in the holding portion 26, attaches the inflator main body 21 to a predetermined place by wrapping an unshown clamp around from an outer peripheral side. Also, the inflator 20 is attached to the case 35, together with the airbag 17, by the attachment bolt 28 protruding from the airbag 17 being caused to protrude from a bottom wall portion 36 of the case 35 and fastened with a nut 29.

The case 35 is made of sheet metal, and is of a configuration having rigidity, and includes the bottom wall portion 36 and a peripheral wall portion 37 of an approximately rectangular tube form extending upward from the bottom wall portion 36, as shown in FIG. 2. A protrusion aperture 35a from which the inflating airbag 17 can be protruded is disposed on the upper end side of the case 35. The case 35 is of an elongated box form wherein a left-right direction side is wider. Through holes 38a and 39a are formed respectively in a front wall portion 38 and a rear wall portion 39 opposing on front-rear direction sides in the peripheral wall portion 37, as shown in FIG. 2. The through holes 38a and 39a are for blind rivets 70 (rivets) for attaching an attachment piece portion 52, to be described hereafter, in the airbag cover 45 to be passed through. Although a detailed depiction is omitted, the through holes 38a and 39a are formed opened in an approximately circular form in such a way that a body 70b, or a head portion 70e of a shaft 70d, of the blind rivet 70 can be passed through. The through holes 38a and 39a are formed in multiple places following the left-right direction, corresponding to the blind rivets 70.

Also, as shown in FIG. 2, the case 35 of the embodiment is such that vicinities of boundary regions between the front wall portion 38 and rear wall portion 39 in the peripheral wall portion 37 and the bottom wall portion 36 are configured curved in an approximate arc form in cross-section. That is, the case 35 of the embodiment is such that boundary regions between the front wall portion 38 and the bottom wall portion 36, or between the rear wall portion 39 and the bottom wall portion 36 are configured of curved regions 41 and 42, which are curved in an approximate arc form in cross-section.

The airbag cover 45 is made from a soft synthetic resin such as a polyolefin-based thermoplastic elastomer (TPO). The airbag cover 45 includes a top wall portion 46 and the attachment piece portions 52, as shown in FIGS. 2 and 4 to 6. The top wall portion 46 includes a door portion 48 that covers the protrusion aperture 35a of the case 35. The attachment piece portions 52 are regions that extend downward from a peripheral edge of the door portion 48 in the top wall portion 46, and are attached to the peripheral wall portion 37 of the case 35.

In the case of the embodiment, one door portion 48 is disposed in such a way as to cover the protrusion aperture 35a from above over an approximate whole area (refer to FIG. 2). The door portion 48 is configured integrated with the top wall portion 46, and a hinge portion 49 that forms a center of rotation when opening is disposed on a rear edge 48b side. A breakable portion 50 is disposed on the remaining front edge side, left edge side, and right edge side of the door portion 48. Further, when the airbag 17 inflates, the door portion 48 opens to the rear while causing the breakable portion 50 to break. The door portion 48 is of an elongated form whose left-right direction side is wider. In the case of the embodiment, the door portion 48 is disposed inclined downward to the rear in such a way that the rear edge 48b side is positioned farther to a lower side than a front edge 48a side (refer to FIG. 2).

Figure 6:
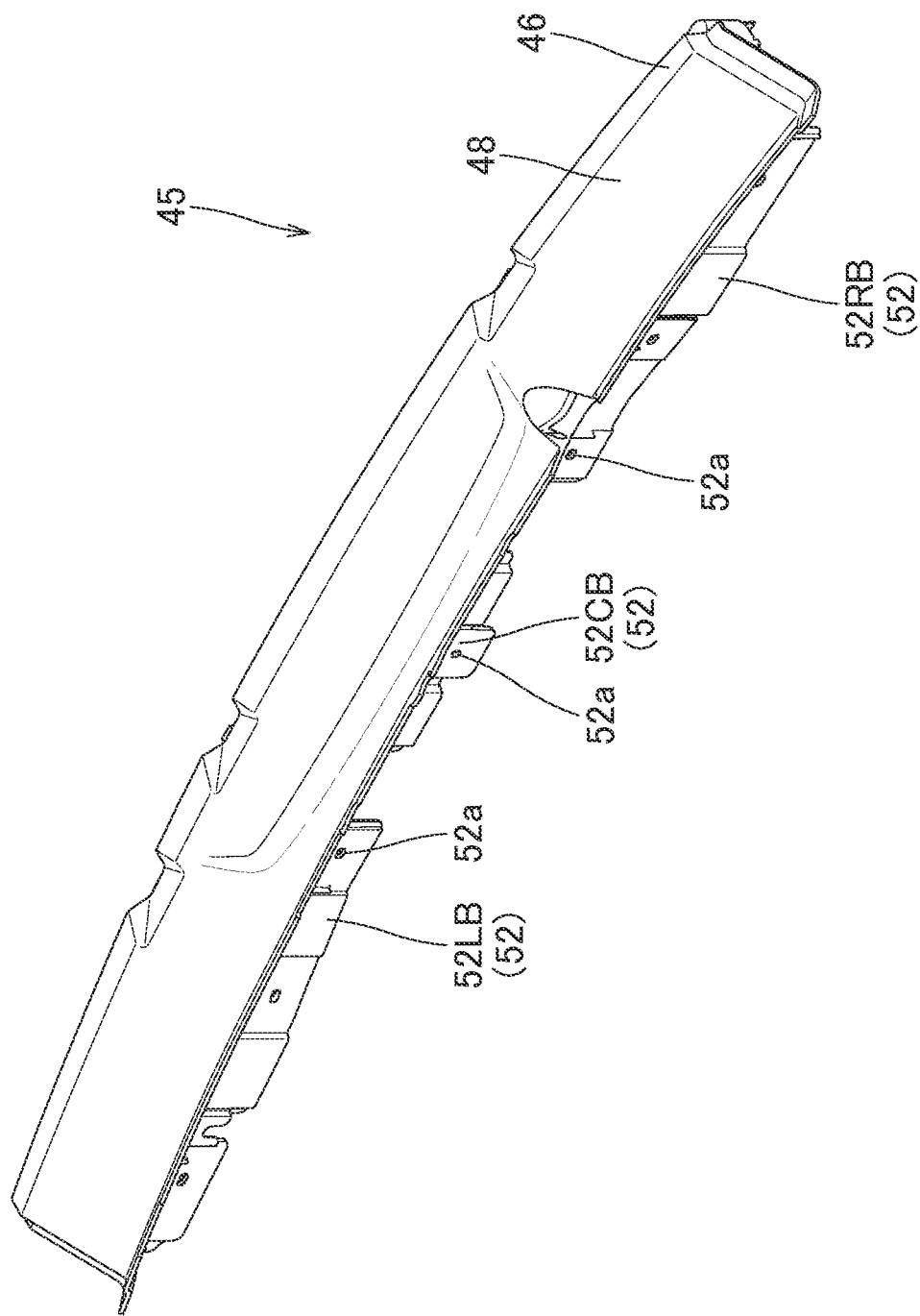
FIG. 6 is a schematic perspective view showing the airbag cover used in the pedestrian airbag device of the embodiment in a state seen from the rear.

The attachment piece portions 52 are formed of the rear edge 48b side of the door portion 48, which is the hinge portion 49 side, and the front edge 48a side, which is a leading end side of the door portion 48 when opening. The attachment piece portions 52 are formed in such a way as to extend downward from the peripheral edge of the door portion 48 in such a way as to cover outer peripheral end sides of the front wall portion 38 and the rear wall portion 39 opposing front-to-rear in the peripheral wall portion 37. In the case of the embodiment, a multiple of the attachment piece portion 52 are juxtaposed on the left-right direction (a longitudinal direction of the case 35) side, as shown in FIGS. 4 and 6. Each attachment piece portion 52 is attached to the front wall portion 38 or the rear wall portion 39 using the blind rivet 70. Through holes 52a through which the body 70b or the head portion 70e of the blind rivet 70 can pass are formed in the attachment piece portion 52, corresponding to the through holes 38a and 39a formed in the front wall portion 38 and the rear wall portion 39.

The airbag device M of the embodiment is such that a rear side central attachment piece portion 52CB disposed on the rear edge 48b side of the door portion 48, which is the hinge portion 49 side, and a left-right central side of the case 35 configures a hinge portion side attachment piece portion. The rear side central attachment piece portion 52CB includes a protruding portion 55 that protrudes toward the rear wall portion 39 side (the front side) in an end edge on a lower end 52b side (refer to FIGS. 2 and 3). That is, the protruding portion 55 formed in the rear side central attachment piece portion 52CB is formed farther to a leading end side than the through hole 52a (the blind rivet 70 through hole region). Also, the protruding portion 55 is disposed in a position opposing the curved region 42, which configures the boundary region between the rear wall portion 39 and the bottom wall portion 36, front-to-rear in a state mounted in a vehicle. Specifically, the protruding portion 55 formed on the lower end 52b side of the rear side central attachment piece portion 52CB is disposed protruding to the rear wall portion 39 side in such a way that a lower face is continuous with a lower end face of the rear side central attachment piece portion 52CB. In the case of the embodiment, a thickness of the protruding portion 55 is approximately the same as a thickness of the rear side central attachment piece portion 52CB. Also, a leading end face (a protruding end face) 56 on the rear wall portion 39 side in the protruding portion 55 is configured in such a way as to approximately follow the up-down direction (approximately follow the rear wall portion 39). Specifically, the protruding portion 55 is formed over approximately a whole left-right area of the rear side central attachment piece portion 52CB (refer to FIG. 5). Also, the protruding portion 55 is disposed in a position in a vicinity of an up-down intermediate region (specifically, slightly downward of an up-down center) of the curved region 42, and is configured in such a way as to be oriented farther than an outer side face (the rear face 39b) of the rear wall portion 39 to a central side (a front side) of the bottom wall portion 36. That is, the protruding portion 55 is configured in such a way that the leading end face (protruding end face) 56 is positioned farther to the front than the rear face 39b of the rear wall portion 39 (refer to FIG. 3). Specifically, the protruding portion 55 is configured in such a way that the leading end face (protruding end face) 56 is positioned farther to the front than a center of the thickness of the rear wall portion 39. Furthermore, the protruding portion 55 is configured in such a way that, with an upper edge 56a, which is an edge on the peripheral wall portion 37 (rear wall portion 39) side in the leading end face (protruding end face) 56, as a position regulating edge portion, the upper edge 56a is disposed in a non-contact state with respect to the curved region 42 in a state wherein the rear side central attachment piece portion 52CB is attached to the rear wall portion 39 (a state mounted in a vehicle). That is, an amount of protrusion of the protruding portion 55 from an inner peripheral face (front face) of the rear side central attachment piece portion 52CB is set in such a way that the leading end face (protruding end face) 56 is in a state of non-contact with the curved region 42 over the whole of the up-down area in a state mounted in a vehicle (refer to FIG. 3).

The attachment brackets 60 are for attaching the airbag device M (the case 35) to the cowl 7 on the body 1 side, and are formed of a sheet metal material. The attachment brackets 60 are disposed on the rear side of the case 35. In the case of the embodiment, the attachment brackets 60 are disposed in three places, those being the left-right direction central side and both left-right end sides of the case 35, as shown in FIG. 4. In the embodiment, a central side attachment bracket 60C disposed on the left-right direction central side will be employed as an example, and described in detail.

The central side attachment bracket 60C is disposed to the rear of a central side region of attachment piece portions 52LB and 52RB disposed one each on the left and right sides, including the rear side central attachment piece portion 52CB. The central side attachment bracket 60C includes a case side attachment portion 61, two panel side attachment portions 66 that extend rearward from a lower edge side of the case side attachment portion 61, and two louver side attachment portions 67 that extend rearward from an upper edge side of the case side attachment portion 61. The case side attachment portion 61 is a region that is disposed in such a way as to follow outer peripheral faces (rear faces) of the attachment piece portions 52LB and 52RB and the rear side central attachment piece portion 52CB, and is attached to the rear wall portion 39 in the peripheral wall portion 37 of the case 35 together with the attachment piece portions 52LB and 52RB and the rear side central attachment piece portion 52CB. The panel side attachment portions 66 and the louver side attachment portions 67 are regions attached to the cowl panel 7a and the cowl louver 7b respectively.

Figure 3:
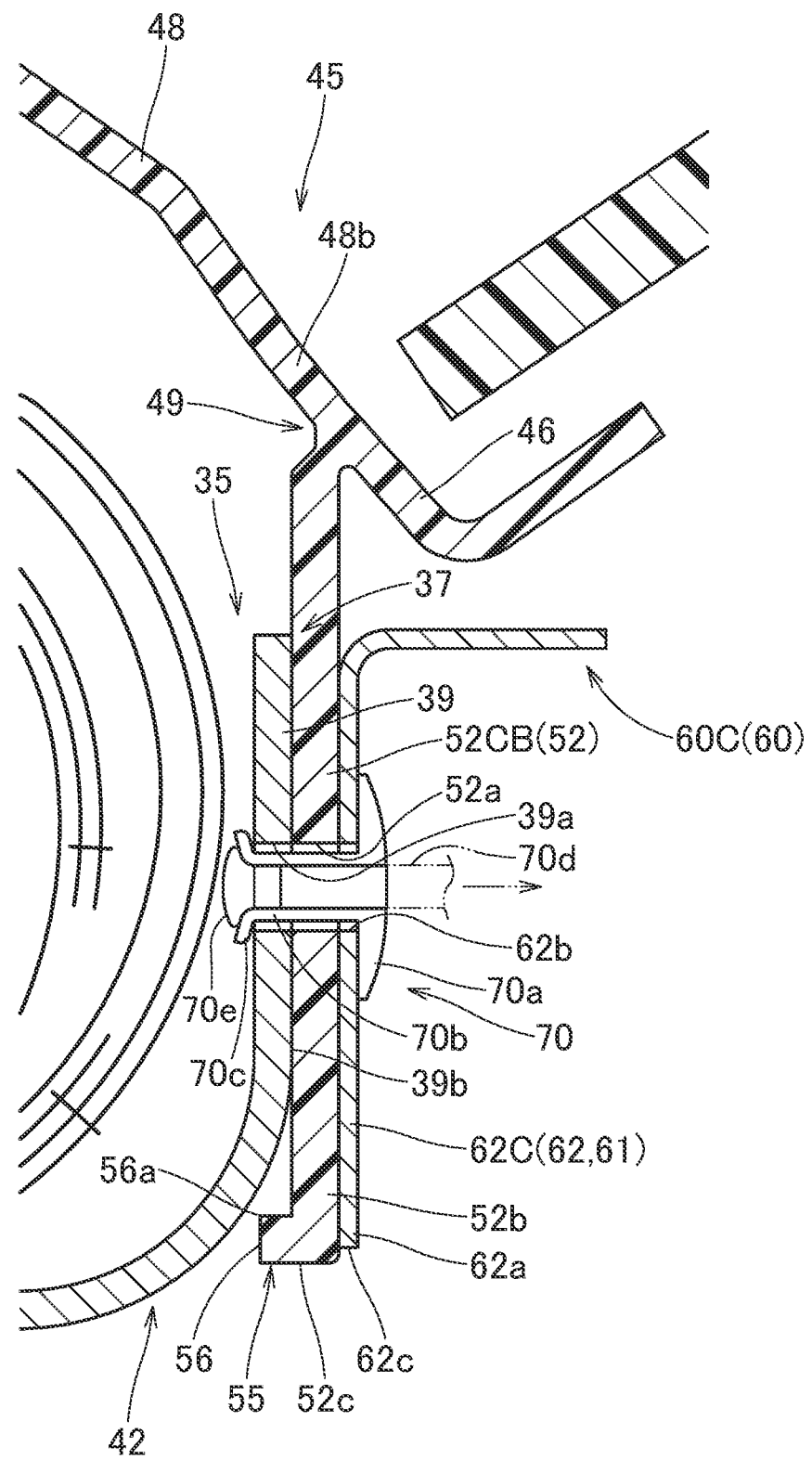
FIG. 3 is a schematic vertical sectional view following the front-rear direction of the pedestrian airbag device of the embodiment, and is a partially enlarged view showing regions of a rear wall portion in the case and an attachment piece portion of an airbag cover.

The case side attachment portion 61 is attached together with the rear side central attachment piece portion 52CB and the attachment piece portions 52LB and 52RB to the rear wall portion 39 using the blind rivet 70. In the case of the embodiment, the case side attachment portion 61 includes three attachment main bodies 62, and two coupling plate portions 63 that couple the attachment main bodies 62. The attachment main bodies 62 are disposed in three places, those being a left-right central side and both left-right end sides of the central side attachment bracket 60C. Each attachment main body 62 is of a plate form disposed approximately following the rear wall portion 39. Through holes 62b through which the body 70b or the head portion 70e of the blind rivet 70 can pass are disposed in the attachment main bodies 62 in positions corresponding to the through holes 39a formed in the rear wall portion 39 and the through holes 52a formed in the attachment piece portion 52. A width dimension of an up-down direction side of the coupling plate portion 63 is set to be in the region of one-half of that of the attachment main body 62, and the attachment main bodies 62 are coupled to each other in an upper side region (refer to FIGS. 4 and 5) by the coupling plate portion 63. An attachment main body 62C disposed on a left-right central side is a region disposed on the rear side of the rear side central attachment piece portion 52CB. The attachment main body 62C is disposed as a backing plate on an outer side face side (a rear side face side) of the rear side central attachment piece portion 52CB in such a way that the rear side central attachment piece portion 52CB is sandwiched by the attachment main body 62C and the rear wall portion 39. As shown in FIG. 3, the central side attachment main body 62C is configured in such a way that a lower end 62a approximately coincides with the lower end 52b of the rear side central attachment piece portion 52CB. That is, the attachment main body 62C is configured in such a way as to extend as far as a region in which the protruding portion 55 provided on the lower end 52b side of the rear side central attachment piece portion 52CB is disposed. Specifically, in the case of the embodiment, a lower end face 62c of the attachment main body 62C is disposed in a position that is below an upper face (the upper edge 56a in the leading end face 56) of the protruding portion 55, and slightly farther to an upper side than a lower end face 52c of the rear side central attachment piece portion 52CB (refer to FIG. 3).

In the central side attachment bracket 60C of the embodiment, two panel side attachment portions 66 are formed in such a way as to extend diagonally downward to the rear from a lower edge 63b on a left-right direction end portion side of each coupling plate portion 63. Two louver side attachment portions 67 are formed in such a way as to extend diagonally upward to the rear from an upper edge 63a of a region between the panel side attachment portion 66 and the attachment main body 62 in each coupling plate portion 63 (refer to a two-dot chain line in FIG. 2 and to FIGS. 4 and 5). Although a detailed depiction is omitted, the panel side attachment portions 66 and the louver side attachment portions 67 are attached to the cowl panel 7a or the cowl louver 7b using an unshown attachment unit.

Each of the blind rivet 70 that attaches the attachment piece portion 52 of the airbag cover 45 to the peripheral wall portion 37 (the front wall portion 38 or the rear wall portion 39) of the case 35 includes a flange 70a, the body 70b, the shaft 70d, and the head portion 70e. The flange 70a is a region exposed on an outer side face side of the attachment piece portion 52 in the airbag cover 45 or the attachment main body 62 (62C) in the attachment bracket 60. The body 70b is a region disposed in such a way as to penetrate the attachment main body 62 (62C), the attachment piece portion 52, and the peripheral wall portion 37 (the front wall portion 38 or the rear wall portion 39). The shaft 70d is a region disposed in the body 70b. The head portion 70e is a region disposed on an inner peripheral face side of the peripheral wall portion 37 on a leading end side of the shaft 70d. Although a detailed depiction is omitted, the blind rivet 70 is of a configuration that attaches the attachment piece portion 52 to the peripheral wall portion 37 (the front wall portion 38 or the rear wall portion 39) in the following way, Firstly, the attachment piece portion 52, the peripheral wall portion 37 (the front wall portion 38 or the rear wall portion 39), and the attachment main body 62 (62C) are stacked. The body 70b in a state before an expanded diameter portion 70c is formed is inserted from the outer side in such a way as to pass through the through holes 38a, 39a, 52a, and 62b in a state wherein the shaft 70d on whose leading end side the head portion 70e is provided (refer to a two-dot chain line in FIG. 3) is inserted. Subsequently, the shaft 70d is pulled out from the flange 70a side, and the expanded diameter portion 70c expanded on a leading end side of the body 70b is formed by a pressing force of the remaining head portion 70e. In this way, the attachment piece portion 52 is attached to the peripheral wall portion 37 (the front wall portion 38 or the rear wall portion 39).

Next, a mounting of the airbag device M of the embodiment in a vehicle will be described. Firstly, the airbag 17 is folded in such a way as to be able to be housed in the case 35. The inflator 20 is housed in the folded airbag 17 in such a way as to cause the attachment bolt 28 to protrude, thereby manufacturing an airbag assembly. Subsequently, the airbag assembly is housed in the case 35, and the airbag 17 and the inflator 20 can be attached to the case 35 by the nuts 29 being fastened onto the attachment bolts 28 of the inflator 20 protruding from the bottom wall portion 36 of the case 35. Subsequently, the airbag cover 45 is placed onto the case 35 from above. The attachment bracket 60 is attached to the case 35 side using the blind rivets 70, simultaneously with the airbag cover 45 being attached to the case 35, in a state wherein the case side attachment portion 61 is superimposed on the outer side face side of the attachment piece portion 52 of the airbag cover 45. Next, the panel side attachment portion 66 and the louver side attachment portion 67 in the attachment bracket 60 are attached to the cowl panel 7a and the cowl louver 7b using an unshown attachment unit. Subsequently, the airbag device M can be mounted in the vehicle V by the inflator 20 being connected to an unshown operation circuit.

The airbag device M of the embodiment is such that when an unshown operation circuit detects a collision between the vehicle V and a pedestrian based on a signal from an unshown sensor disposed in a front bumper 6, the inflator 20 is operated, an inflating gas is caused to flow into the interior, and the airbag 17 inflates. Further, the inflating airbag 17 pushes open the door portion 48 of the airbag cover 45, and protrudes upward from the protrusion aperture 35a of the case 35 formed by the door portion 48 being pushed open. Subsequently, the airbag 17 is such that inflation is completed in such a way as to cover a region from the upper face of the rear end 15c of the hood panel 15 to the upper face of the cowl 7, and the lower portion 5a sides of the front faces of the front pillars 5L and 5R (refer to a two-dot chain line in FIG. 1).

Figure 7A:
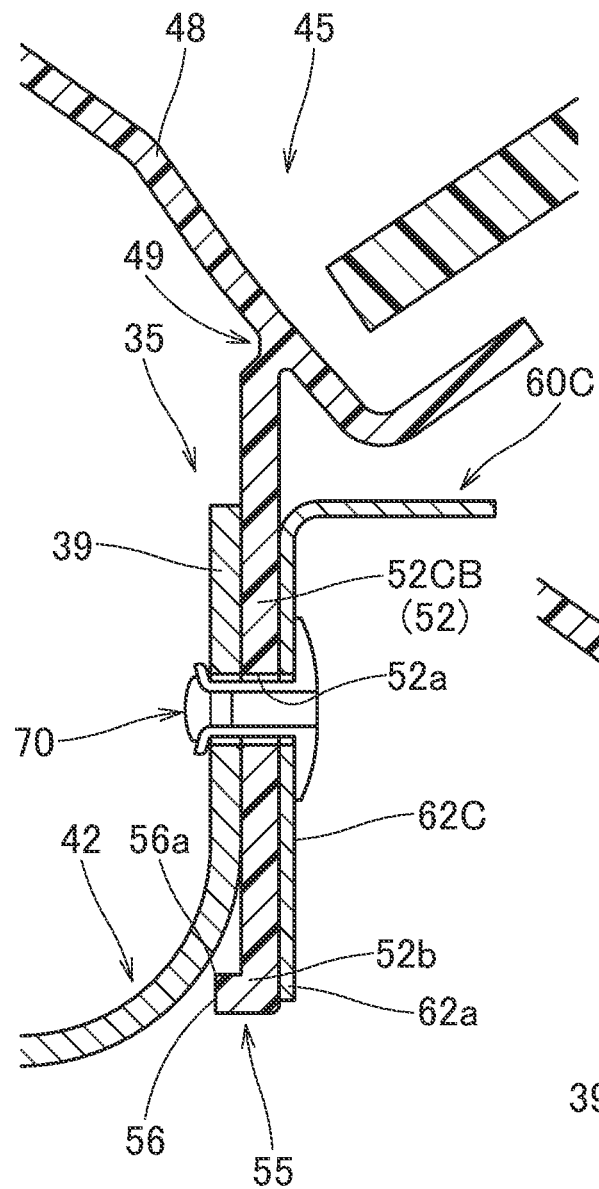
Figure 7B:
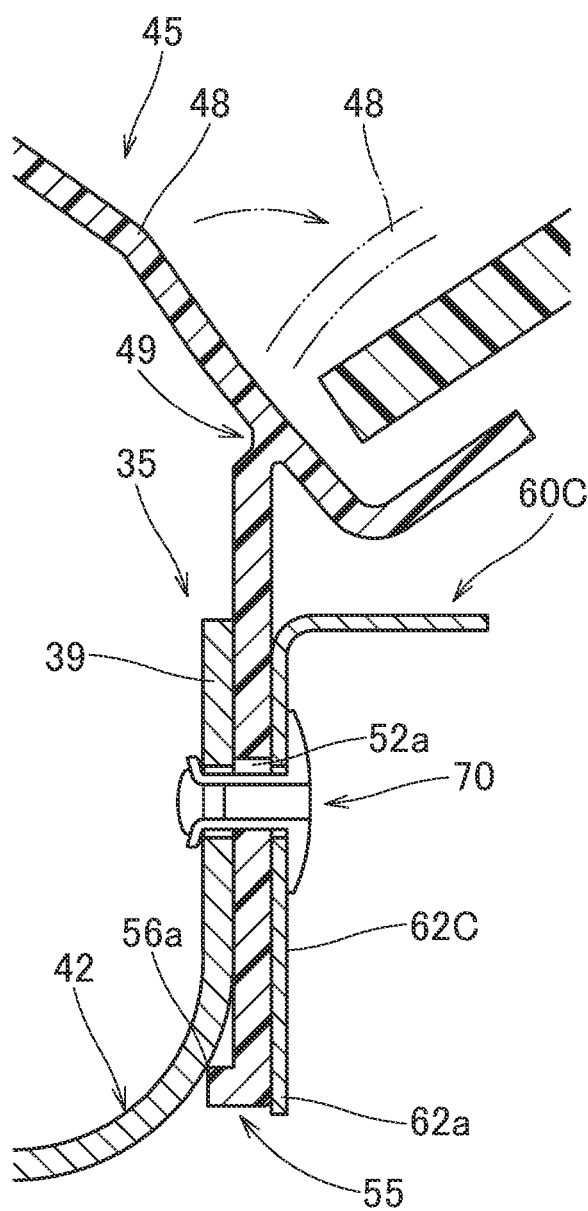

Further, in the airbag device M of the embodiment, when the airbag 17 housed folded in the case 35 inflates due to an inflating gas being caused to flow into the interior, and pushes open the door portion 48 of the airbag cover 45, the attachment piece portion 52 (the rear side central attachment piece portion 52CB) of the airbag cover 45 attempts to move upward to the protrusion aperture 35a side of the case 35 in conjunction with the pushing up of the door portion 48. However, the protruding portion 55 provided farther than the blind rivet 70 attached to the peripheral wall portion 37 (the rear wall portion 39) to the leading end side (the lower end 52b side) in the rear side central attachment piece portion 52CB presses the position regulating edge portion (the upper edge 56a) formed of the edge on the peripheral wall portion 37 (the rear wall portion 39) side against the rear wall portion 39 of the case 35 when the rear side central attachment piece portion 52CB moves (refer to FIG. 7B), whereby further upward movement of the rear side central attachment piece portion 52CB can be restricted. Because of this, in the pedestrian airbag device of the embodiment, a pressing force generated by the inflating airbag 17 can be restricted from acting on a peripheral edge of the through hole 52*a* through which the blind rivet 70 is caused to pass in the rear side central attachment piece portion 52CB, and caused to act smoothly on the peripheral edge of the door portion 48. As a result of this, the door portion 48 can swiftly be caused to open while the breakable portion 50 of the peripheral edge is swiftly caused to break.

Consequently, the airbag device M of the embodiment is such that the door portion 48 provided in the airbag cover 45 can swiftly be opened, and the airbag 17 can be caused to inflate smoothly.

Also, in the airbag device M of the embodiment, the protruding portion 55 formed on an end edge side (the lower end 52*b* side) of the rear side central attachment piece portion 52CB is formed protruding toward the case 35 side. However, the protruding portion 55 is disposed in a state of non-contact with the curved region 42 in a position opposing the curved region 42, which configures the boundary region between the bottom wall portion 36 and the rear wall portion 39 in the case 35, front-to-rear in a state wherein the rear side central attachment piece portion 52CB is attached to the peripheral wall portion 37 (the rear wall portion 39) (a state mounted in a vehicle). In other words, rather than being disposed in a position wherein the protruding portion 55 is pressed against the rear wall portion 39 of the case 35 in a state wherein the rear side central attachment piece portion 52CB is attached to the rear wall portion 39, the protruding portion 55 is disposed in such a way that a gap is provided between the protruding portion 55 and the case 35, even when the rear side central attachment piece portion 52CB is superimposed on the rear wall portion 39 and the blind rivet 70 is caused to pass through. Because of this, the rear side central attachment piece portion 52CB does not become detached from the rear wall portion 39 when carrying out a coupling operation using the blind rivet 70, regions on the peripheral edges of the through holes 39*a* and 52*a* of the rear side central attachment piece portion 52CB and the rear wall portion 39 can be brought into surface contact with each other, and a coupling operation can be carried out stably.

Furthermore, in the airbag device M of the embodiment, the attachment main body 62C of the case side attachment portion 61 of the central side attachment bracket 60C acting as a backing plate is disposed in such a way that the rear side central attachment piece portion 52CB is sandwiched by the attachment main body 62C and the rear wall portion 39 on the outer side face side (the rear side face side) of the rear side central attachment piece portion 52CB. The attachment main body 62C is configured in such a way as to extend as far as a region in which the protruding portion 55 is disposed, and is coupled to the rear wall portion 39 and the rear side central attachment piece portion 52CB using the blind rivet 70. Because of this, a movement toward the rear of the rear side central attachment piece portion 52CB such as to separate from the rear wall portion 39 can be restricted by the attachment main body 62C, meaning that movement of the rear side central attachment piece portion 52CB when the airbag 17 inflates can be restricted still more appropriately.

Further still, the airbag device M of the embodiment is of a configuration wherein one door portion 48 is disposed in such a way as to cover the protrusion aperture 35*a* of the case 35 over approximately the whole area, and the protruding portion 55 is formed on only the lower end 52*b* side of the rear side central attachment piece portion 52CB, which is a hinge portion side attachment piece portion disposed on the hinge portion 49 side. Because of this, the hinge portion 49 side (the rear edge 48*b* side, which is a base portion side of the door portion 48) that forms the center of rotation of opening in the door portion 48 when the airbag 17 starts inflating can be restricted from moving in such away as to separate from the case 35 due to being pressed by the inflating airbag 17. As a result of this, tensile stress acting when the peripheral edge of the door portion 48 breaks can be caused to concentrate on a starting point of breaking in the peripheral edge of the door portion 48, and the starting point of the breaking can immediately be caused to break, because of which the whole of the door portion 48 can swiftly be caused to open.

The present disclosure relates to an airbag device of the following configuration.

The airbag device is mounted in a vehicle, and includes an airbag that can inflate owing to an inflating gas being caused to flow into an interior, a case having rigidity, in which the folded airbag is housed and which has a protrusion aperture through which the inflating airbag can be protruded, and an airbag cover that is made from a soft synthetic resin and covers the folded airbag, wherein the case has a bottom wall portion and a peripheral wall portion of an approximately rectangular tube form extending from the bottom wall portion, is of an approximate box form including the protrusion aperture, and a vicinity of a boundary region between the peripheral wall portion and the bottom wall portion is configured curved in an approximate arc form in cross-section, the airbag cover includes a top wall portion having a door portion that covers the protrusion aperture and can open by being pushed by the airbag while a peripheral edge is broken when the airbag is inflating, and an attachment piece portion that extends from a hinge portion side forming a center of rotation when the door portion opens or a leading end side when the door portion opens in the top wall portion, and is attached to the peripheral wall portion, the attachment piece portion is of a configuration attached to the peripheral wall portion by a multiple of rivets disposed in such a way as to penetrate through holes provided in the attachment piece portion and the peripheral wall portion, and is configured to include a protruding portion that protrudes toward the peripheral wall portion side in an end edge farther to a leading end side than a region of penetration of at least one rivet, and the protruding portion is disposed in a position opposing a curved region configuring a boundary region between the peripheral wall portion and the bottom wall portion in a state wherein the attachment piece portion is attached to the peripheral wall portion, is protruded in such a way as to be oriented farther to a central side of the bottom wall portion than an outer side face of the peripheral wall portion, and is configured in such a way as to be disposed in a state of non-contact with the curved region, with an edge on the peripheral wall portion side of a protruding end face as a position regulating edge portion.

In the airbag device of the present disclosure, the airbag housed folded in the case inflates owing to an inflating gas being caused to flow into an interior, and when the door portion of the airbag cover is pushed open, the attachment piece portion attempts to move to the protrusion aperture side of the case in conjunction with the pushing up of the door portion. However, the protruding portion provided farther to a leading end side than the rivet attached to the peripheral wall portion in the attachment piece portion presses the position regulating edge portion formed of the edge on the peripheral wall portion side against the peripheral wall portion of the case when the attachment piece portion moves, whereby further movement of the attachment piece portion can be restricted. Because of this, in the pedestrian airbag device of the present disclosure, a pressing force generated by the inflating airbag can be restricted from acting on a peripheral edge of a through hole through which the rivet is caused to pass in the attachment piece portion, and can be caused to act smoothly on a peripheral edge of the door portion. As a result of this, the door portion can swiftly be caused to open while the peripheral edge is swiftly caused to break.

Consequently, the airbag device of the present disclosure is such that the door portion provided in the airbag cover can swiftly be opened, and the airbag can be caused to inflate smoothly.

Also, in the airbag device of the present disclosure, the protruding portion formed on an end edge side of the attachment piece portion is formed protruding toward the case side. However, the protruding portion is disposed in a state of non-contact with the curved region in a position opposing the curved region, which configures the boundary region between the bottom wall portion and the peripheral wall portion in the case, in a state wherein the attachment piece portion is attached to the peripheral wall portion. In other words, rather than being disposed in a position wherein the protruding portion is pressed against the peripheral wall portion of the case in a state wherein the attachment piece portion is attached to the peripheral wall portion, the protruding portion is disposed in such a way that a gap is provided between the protruding portion and the case, even when the attachment piece portion is superimposed on the peripheral wall portion and the rivet is caused to pass through. Because of this, the attachment piece portion does not become detached from the peripheral wall portion when carrying out a coupling operation using the rivet, regions on the peripheral edges of the through holes of the attachment piece portion and the peripheral wall portion can be brought into surface contact with each other, and a coupling operation can be carried out stably.

Furthermore, in the airbag device of the present disclosure, it is preferable that a backing plate is disposed in such a way that the attachment piece portion is sandwiched by the backing plate and the peripheral wall portion on an outer side face side of the attachment piece portion, and the backing plate is configured in such a way as to extend as far as a region in which the protruding portion is disposed, and is coupled to the peripheral wall portion and the attachment piece portion using the rivet.

When the airbag device is of the heretofore described configuration, a movement of the attachment piece portion such as to separate from the peripheral wall portion can be restricted by the backing plate, meaning that movement of the attachment piece portion when the airbag inflates can be restricted still more appropriately.

Further still, the airbag device of the heretofore described configuration is preferably of a configuration wherein one door portion is disposed in such a way as to cover the protrusion aperture over approximately a whole area, and the protruding portion is formed on only a lower end side of a hinge portion side attachment piece portion disposed on the hinge portion side.

When the airbag device is of the heretofore described configuration, the hinge portion side (a base portion side of the door portion) that forms the center of rotation of opening in the door portion when the airbag starts inflating can be restricted from moving in such a way as to separate from the case due to being pressed by the inflating airbag. Because of this, tensile stress acting when the peripheral edge of the door portion breaks can be caused to concentrate on a starting point of breaking in the peripheral edge of the door portion, and the starting point of the breaking can immediately be caused to break, because of which the whole of the door portion can swiftly be caused to open.

What is claimed is:

1. An airbag device mounted in a vehicle, comprising:
an airbag that can inflate owing to an inflating gas being caused to flow into an interior;
a case having rigidity, in which the folded airbag is housed and which has a protrusion aperture through which the inflating airbag can be protruded;
and an airbag cover that is made from a soft synthetic resin and covers the folded airbag, wherein
the case has a bottom wall portion and a peripheral wall portion of an approximately rectangular tube form extending from the bottom wall portion, is of an approximate box form including the protrusion aperture, and a vicinity of a boundary region between the peripheral wall portion and the bottom wall portion is configured curved in an approximate arc form in cross-section,
the airbag cover includes a top wall portion having a door portion that covers the protrusion aperture and can open by being pushed by the airbag while a peripheral edge is broken when the airbag is inflating, and
an attachment piece portion that extends from a hinge portion side forming a center of rotation when the door portion opens or a leading end side when the door portion opens in the top wall portion, and is attached to the peripheral wall portion,
the attachment piece portion is of a configuration attached to the peripheral wall portion by a multiple of rivets disposed in such a way as to penetrate through holes provided in the attachment piece portion and the peripheral wall portion, and is configured to include a protruding portion that protrudes toward the peripheral wall portion side in an end edge farther to a leading end side than a region of penetration of at least one rivet, and
the protruding portion is disposed in a position opposing a curved region configuring a boundary region between the peripheral wall portion and the bottom wall portion in a state wherein the attachment piece portion is attached to the peripheral wall portion, is protruded in such a way as to be oriented farther to a central side of the bottom wall portion than an outer side face of the peripheral wall portion, and is configured in such a way as to be disposed in a state of non-contact with the curved region, with an edge on the peripheral wall portion side of a protruding end face as a position regulating edge portion.

2. The airbag device according to claim 1, wherein
a backing plate is disposed in such a way that the attachment piece portion is sandwiched by the backing plate and the peripheral wall portion on an outer side face side of the attachment piece portion, and
the backing plate is configured in such a way as to extend as far as a region in which the protruding portion is disposed, and is coupled to the peripheral wall portion and the attachment piece portion using the rivet.

3. The airbag device according to claim 2, wherein
one door portion is disposed in such a way as to cover the protrusion aperture over approximately a whole area, and the protruding portion is formed on only a leading end side of a hinge portion side attachment piece portion disposed on the hinge portion side.

4. The airbag device according to claim 1, wherein
one door portion is disposed in such a way as to cover the protrusion aperture over approximately a whole area, and the protruding portion is formed on only a leading end side of a hinge portion side attachment piece portion disposed on the hinge portion side.

5. The airbag device according to claim 1, wherein
the airbag device is mounted in a vicinity of a rear end of a hood panel in the vehicle,
the case is of an elongated approximate box form wherein a left-right direction side is wider,
the door portion is of an elongated form wherein a left-right direction side is wider,
a multiple of the attachment piece portion are disposed on a left-right direction side, and the protruding portion is disposed in one central attachment piece portion.

* * * * *